US008838376B2

(12) United States Patent
Garin et al.

(10) Patent No.: US 8,838,376 B2
(45) Date of Patent: Sep. 16, 2014

(54) MASHUP OF AP LOCATION AND MAP INFORMATION FOR WIFI BASED INDOOR POSITIONING

(75) Inventors: Lionel Jacques Garin, Palo Alto, CA (US); Sundar Raman, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/436,600

(22) Filed: Mar. 30, 2012

(65) Prior Publication Data

US 2013/0257657 A1    Oct. 3, 2013

(51) Int. Cl.
G01C 21/32    (2006.01)

(52) U.S. Cl.
USPC .......................................... 701/409; 701/206

(58) Field of Classification Search
USPC ........................................................ 701/409
See application file for complete search history.

(56) References Cited

U.S. PATENT DOCUMENTS

| | | | |
|---|---|---|---|
| 6,674,403 B2 | 1/2004 | Gray et al. | |
| 7,496,445 B2 * | 2/2009 | Mohsini et al. | 701/434 |
| 8,040,219 B2 | 10/2011 | Haartsen et al. | |
| 2006/0019679 A1 | 1/2006 | Rappaport et al. | |
| 2008/0004796 A1 * | 1/2008 | Schott et al. | 701/201 |
| 2008/0046170 A1 | 2/2008 | DeGrazia | |
| 2009/0069033 A1 | 3/2009 | Karstens et al. | |
| 2010/0125409 A1 * | 5/2010 | Prehofer | 701/207 |
| 2011/0059752 A1 * | 3/2011 | Garin et al. | 455/456.1 |
| 2011/0137549 A1 * | 6/2011 | Gupta et al. | 701/201 |
| 2012/0007779 A1 * | 1/2012 | Klepal et al. | 342/451 |

FOREIGN PATENT DOCUMENTS

WO    2009021068    2/2009

OTHER PUBLICATIONS

International Search Report and Written Opinion—PCT/US2013/028937—ISA/EPO—Sep. 3, 2013.
Khider, et al., The Effect of Maps-Enhanced Novel Movement Models on pedestrian Navigation Performance, European Navigation Conference. ENC-GNSS 2008, Apr. 22, 2008, pp. 1-11, XP007917985, Sections 1.; 1.1.; 1.3.2.; 3.
Moses, et al., "A Self-Localization Method for Wireless Sensor Networks," EURASIP Journal on Applied Signal Processing, vol. 2003, Issue 4, pp. 348-358, Mar. 2003.

* cited by examiner

Primary Examiner — Helal A Algahaim
Assistant Examiner — Michael Fouche
(74) Attorney, Agent, or Firm — Silicon Valley Patent Group LLP

(57) ABSTRACT

An apparatus and method for merging a disjoint pair of maps comprising a digital building map that includes a floor plan and an access point (AP) map that includes identifiers for a plurality of access points is presented. In some embodiments, a first trajectory plot, of a mobile device, relative to the AP map, is received and a plurality of hypotheses is set, where each hypothesis defines a unique translation between the AP map and the building map. A plurality of costs may be computed for the first trajectory, where each cost of the first trajectory corresponds to a distinct hypothesis in the plurality of hypotheses. The hypothesis where the first trajectory has the lowest cost relative to the other hypotheses may be selected.

36 Claims, 7 Drawing Sheets

MASHUP OF AP LOCATION AND MAP INFORMATION FOR WIFI BASED INDOOR POSITIONING

CROSS-REFERENCE TO RELATED APPLICATIONS

Not Applicable.

BACKGROUND

I. Technical Field

This disclosure relates generally to apparatus and methods for merging a building map or other route map with an access point (AP) map or other transmitter map, and more particularly to applying trajectories, relative to the AP map, through various orientations of the building map to find a best fit.

II. Background

Typically, indoor positioning and routing using Wi-Fi networks may be based on a map that shows both building layout and locations of access points (APs). The maps used for indoor positioning and routing using Wi-Fi may be generated by combining two separate maps: an AP map showing locations of access points (APs); and a building map showing locations of walls, passages, doors, windows, etc.

FIG. 1 shows a typical building map 100 with a floor plan that indicates walls 110, doorways 120, hallways 130, rooms 135 and exits 140. In general, a pathway map including common, set or fixed indoors and/or outdoors pathways may be used, such as a two-dimensional map of a theme park or other complex including common indoor and/or outdoor routes. For simplicity, a building map is used as one example of a pathway map described below and is a specific example of an indoor and/or outdoor two-dimensional map or other pathway map. The pathways of the building map including a floor plan are defined by the walls 110, doorways 120, hallways 130, rooms 135 and exits 140.

FIG. 1 shows a building map orientation marker 150 indicating cardinal direction North, which is shown by an arrow labeled "N". Orientation marker 150 is shown for informative purposes only and is typically not provided for building maps—such as building map 100. A building map may be provided, for example, by the operator of the venue.

FIG. 2 shows an Access Point map 200 showing the locations of Access Points AP0 210, AP1 220, AP2 230, AP3 240 and AP4 250. In general, a Radio Frequency ("RF") map shows relative locations of various transmitters. The scale and/or orientation of the RF map is disassociated from the pathway map described above. That is, the scale and/or orientation of the RF map is unknown with relation to the pathway map. The Access Point map 200 is one form of a transmitter map or an RF map. An RF map may also be created from transmissions of cellular base stations, node-Bs, Bluetooth base stations, or a combination of types of transmitters having fixed or semi-fixed transmitters.

In FIG. 2, the AP map 200 is an RF map that show locations of various access points. FIG. 2 also shows AP map orientation marker 260 indicating cardinal direction North, which is shown by an arrow labeled "N". Orientation marker 250 is shown for informative purposes only and is typically not provided or not accurately provided for transmitter maps or AP maps—such as AP map 200.

FIG. 3 shows heat map 300, which shows RF coverage throughout a facility. As shown in FIG. 3, the areas encompassed by dotted-lines indicate the RF coverage for various access points. For example, as shown in FIG. 3, the RF coverage area 310 may correspond to AP0 210. Similarly, RF coverage areas 320, 330, 340 and 350 may correspond to AP1 220, AP2 230, AP3 240 and AP4 250, respectively. In some instances, heat map 300 may be color coded to indicate the strengths of RF fields at a given point in heat map 300. In some instances, AP map 200 and/or heat map 300 may include an RSSI (received signal strength indication) map and/or an RTT (round-trip time) map. Although, not always provided, AP map 200 and/or heat map 300 may also include geo-location information anchoring at least one of the plurality of access points to the geo-location.

AP map 200 and building map 100 may come from different uncoordinated sources. Moreover, AP map 200 and a building map 100 may not be referenced to the same coordinate system. In some instances, AP map 200 and/or building map 100 may not be geo-referenced at all. A geo-referenced map can provide at least one point on the map defined by a coordinate system such as longitude-latitude point, for example, from a GPS device. A geo-referenced map may also contain an indication of Cardinal direction and/or additional geo-referenced points. Typically, a geo-referenced map from a map vendor contains no AP location information.

In the situations described above, misplacement and uncertainty of AP locations on a combined map showing both building layout and AP locations directly translates to extra position error. Thus, there is a need to place or overlay the APs locations accurately on a building map to minimize errors.

FIG. 4 shows a map of self-locating access points 400 generated using information provided by one or more self-locating APs. In some instances, one or more Self-Locating APs (SLAPs) may be able to separately provide information relating to the relative locations of the APs with respect to each other. For example, as shown in FIG. 4, AP0 210 with coordinates (x, y)=(0, 0) is the origin of the AP coordinate system and the locations of APs 220, 230, 240 and 250, may be given relative to AP 210. In other circumstances, one or more self-locating APs may be able to provide a geo-reference. In other situations, no AP may provide a geo-reference. Moreover, to the extent that a geo-reference is provided, such geo-references may be very inaccurate or uncertain.

In addition to being expensive, both computationally and financially, equipping every access point with a GPS to obtain location information would also greatly increase power requirements. Furthermore, GPS signals may not be reliably detectable at indoor access point locations.

Thus, there is interest in utilizing methods to self-localize the access point with a minimum of additional hardware. Therefore, methods and devices that combine the AP map with the building map and provide both AP locations and location connectivity information (LCI) on a single map using a unitary coordinate system are desired. Such a merged map may be used, for example, for future position determination of various mobile devices.

SUMMARY

Disclosed is an apparatus and method for meshing maps together. The disclosure below describes overlaying a transmitter map and a pathway map together by meshing up the locations of the transmitters with the pathways. In a typical situation, the relative locations of access points (or other transmitters) placed within a building are meshed up and fixed to a building map or floor plan (or other pathway map) by recording routes taken by one or more users carrying a mobile device, determining likely paths of those recorded routes, and then estimating the relative scaling and orientation differences between the access point map and floor plan. In this manner, a transmitter map is meshed up with a pathway map by estimating relative scaling and orientation from one or more routes taken by the one or more users.

According to some aspects, disclosed is a processor implemented method for merging disjoint maps, the method comprising: receiving a digital file comprising a pathway map; receiving a transmitter map comprising identifiers for a plurality of transmitters; receiving a first trajectory plot, of a mobile device, relative to the transmitter map; setting a plurality of hypotheses each defining a unique translation between the transmitter map and the pathway map; computing, in the processor, a plurality of costs, wherein each cost of the plurality of costs comprises a cost of the first trajectory plot through the pathway map based on a respective one of the plurality of hypotheses; and selecting one hypothesis from the plurality of hypotheses, based on a minimum of the plurality of costs.

According to some aspects, disclosed is a mobile device for merging disjointed maps, the device comprising: means for receiving a digital file comprising a route map; means for receiving a transmitter map comprising identifiers for a plurality of transmitters; means for receiving a first trajectory plot, of a mobile device, relative to the transmitter map; means for setting a plurality of hypotheses each defining a unique translation between the transmitter map and the route map; means for computing a plurality of costs, wherein each cost of the plurality of costs comprises a cost of the first trajectory plot through the route map based on a respective one of the plurality of hypotheses; and means for selecting one hypothesis from the plurality of hypotheses, based on a minimum of the plurality of costs.

According to some aspects, disclosed is a device comprising a processor and a memory for merging disjointed maps, wherein the memory includes software instructions for: receiving a digital file comprising a route map; receiving transmitter map comprising identifiers for a plurality of transmitters; receiving a first trajectory plot, of a mobile device, relative to the transmitter map; setting a plurality of hypotheses each defining a unique translation between the transmitter map and the route map; computing a plurality of costs, wherein each cost of the plurality of costs comprises a cost of the first trajectory plot through the route map based on a respective one of the plurality of hypotheses; and selecting one hypothesis from the plurality of hypotheses, based on a minimum of the plurality of costs.

According to some aspects, disclosed is a computer-readable storage medium including program code stored thereon, comprising program code for: receiving a digital file comprising a route map; receiving a transmitter map comprising identifiers for a plurality of transmitters; receiving a first trajectory plot, of a mobile device, relative to the transmitter map; setting a plurality of hypotheses each defining a unique translation between the transmitter map and the route map; computing, in a processor, a plurality of costs, wherein each cost of the plurality of costs comprises a cost of the first trajectory plot through the route map based on a respective one of the plurality of hypotheses; and selecting one hypothesis from the plurality of hypotheses, based on a minimum of the plurality of costs.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

DETAILED DESCRIPTION

Figure 1:
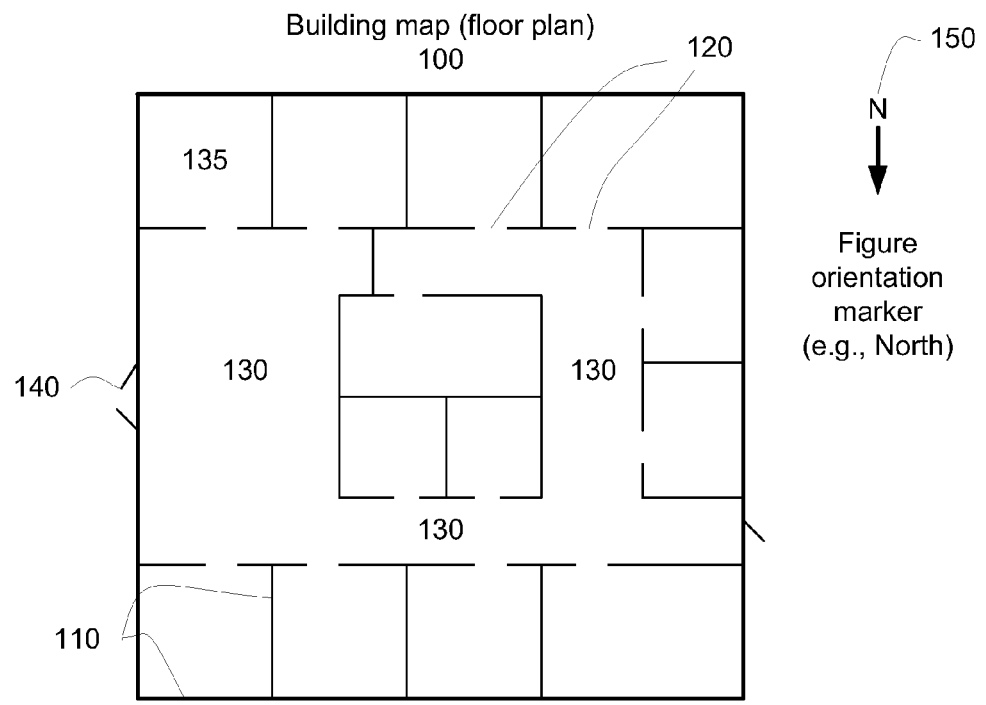
FIG. 1 shows a typical building map with a floor plan that indicates walls doorways, hallways, rooms and exits.
Figure 2:
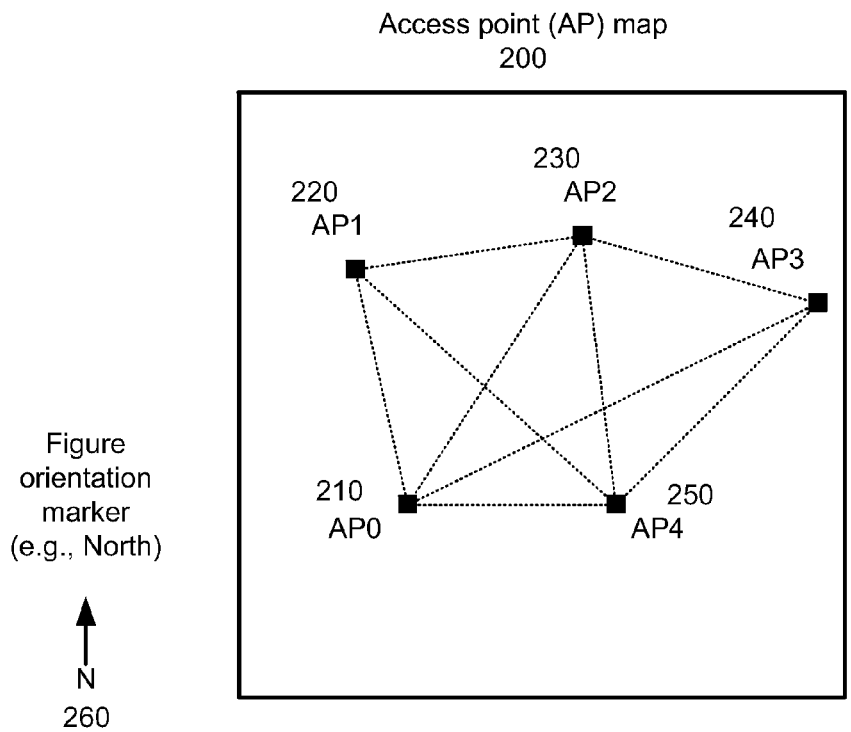
FIG. 2 shows an Access Point map showing the locations of various Access Points in a facility.
Figure 3:
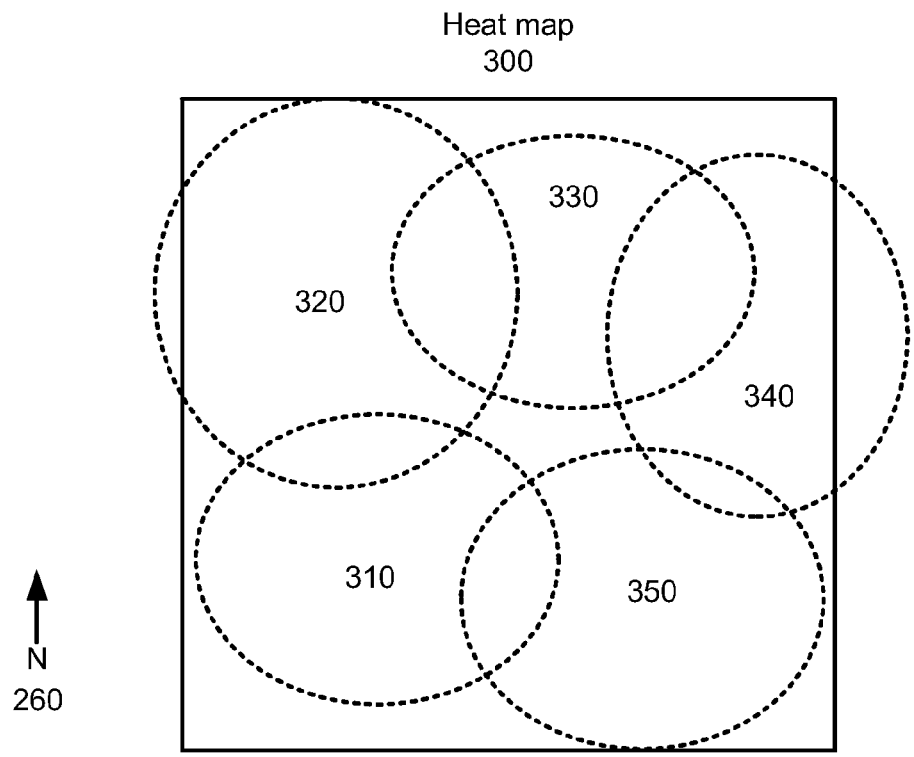
FIG. 3 shows a heat map, which shows areas of RF coverage throughout a facility.
Figure 4:
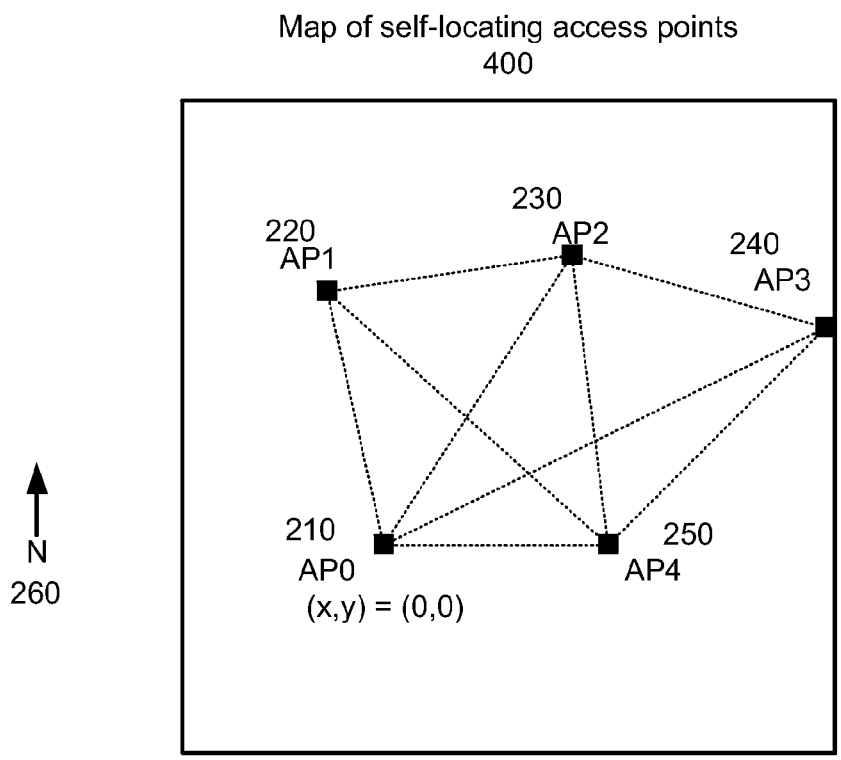
FIG. 4 shows a map of self-locating access points, which may be generated using information provided by one or more self-locating APs.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are used interchangeably in some contexts. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS).

In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

Figure 5:
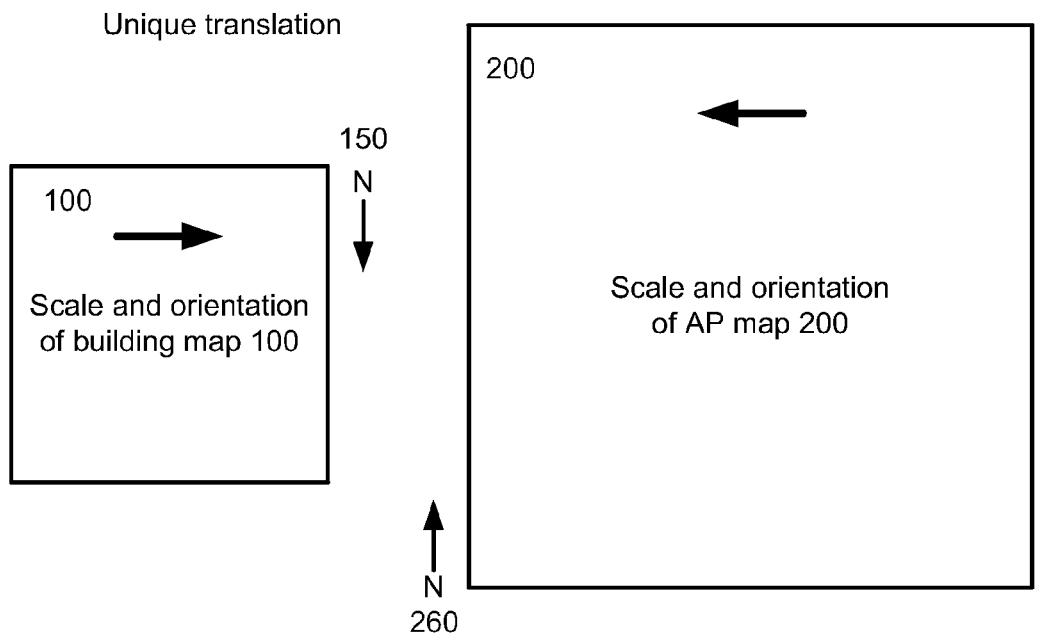
FIG. 5 illustrates two disparate maps, an AP map and a building map that are to be merged into a combined map.

FIG. 5 illustrates two disparate maps 100 and 200 that are to be merged into a combined map. As shown in FIG. 5, building map 100 has a different scale and orientation than AP map 200. In addition, as shown in FIG. 5, the indication of cardinal direction "N" 260 for AP map 200, if superposed correctly (using the given orientation "N" 150) on building map 100, would point downward, whereas, in AP map 200 "N" points upward.

If the building map and the AP map come from the same source (i.e., referenced to the same coordinate system), it is relatively easy to superimpose them on to the same coordinate frame and transform them into an absolute coordinate frame using various control points. However, more often the building map and the AP map come from different sources. Furthermore, it is possible that the relative AP locations are not available and have to be estimated. These estimated locations may be mashed up or otherwise combine or merged such that information from these two sources may be presented in one common usable frame.

One way of achieving this merger of maps is by converting each source of information into an absolute frame (e.g., WGS-84). WGS 84 is the reference coordinate system used by the Global Positioning System. However, this conversion involves two separate geo-reference operations (one for the AP locations and the other for the connectivity information in the building map). The resulting total error or uncertainty introduced is the sum of the individual errors or uncertainties of each map.

Figure 6:
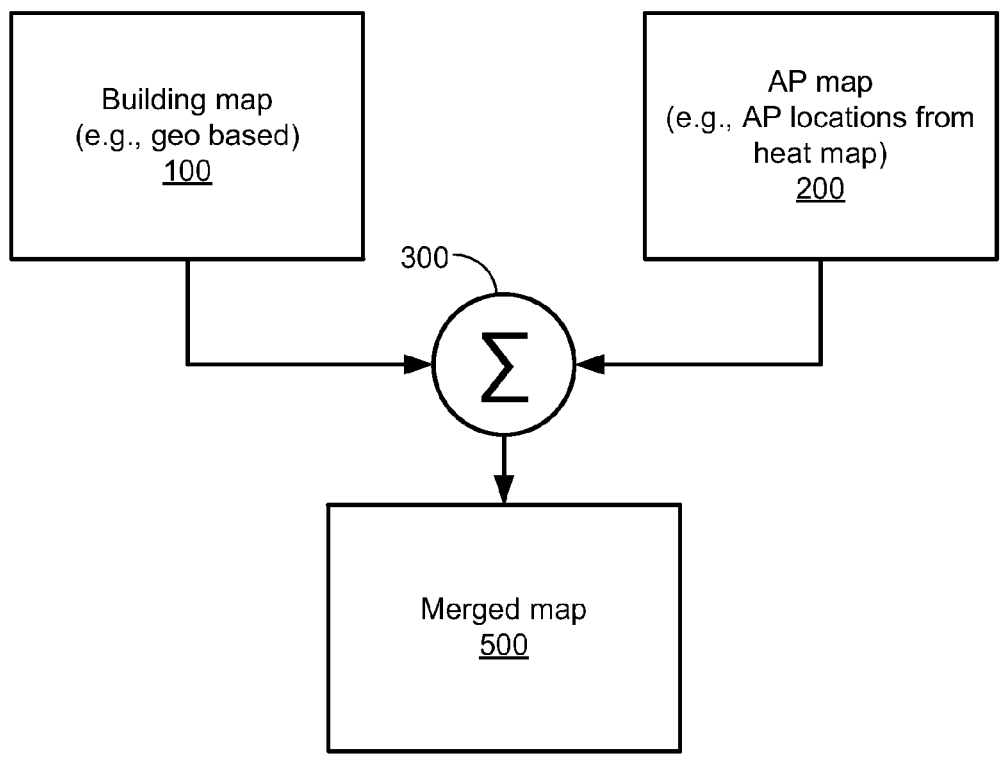
FIG. 6 shows an exemplary merging operation illustrating the combination of building map and AP map to obtain merged map 500.

FIG. 6 shows an exemplary merging operation 300 illustrating the combination of building map 100 and AP map 200 to obtain merged map 500. In some embodiments, a mashing algorithm to combine the maps to obtain merged map 500 may operate with limited or no information pertaining to the scales, relative orientations, and cardinal directions of building map 100 and AP map 200.

For example, AP location information from an AP map 200 and location connectivity information (LCI) from a building map 100 may be used for indoor positioning. Location connectivity information pertains to information about hallways 130, walls 110, rooms 135, doors 120, exits 140 etc. that are typically provided on building maps, such as exemplary building map 100. For instance, AP location information may be used to create RSSI/RTT heat maps and the LCI information may be used within a particle filter (PF) to take advantage of the presence or absence of walls and doors to improve the performance of a position engine (PE). Particle filters, which are well-known in the art, may be used to estimate the distribution and layout of the building shown in building map 100.

Embodiments of the present invention merge AP locations or AP maps 200 with building maps 100. For example, building map 100 containing a floor plan may be converted to a location connectivity information (LCI) grid. An LCI grid may comprise a set of equally spaced grid points and connectivity information between pairs of neighboring grid points. Nodes of open neighbors (e.g., in a hallway, door way or room) are connected whereas nodes physically separated (e.g., by doors and walls) are not connected. In some embodiments, the LCI grid may cover a complete floor of a building shown in building map 100. In an LCI grid representation, a node may mark a point on building map 100 and neighboring nodes that are in direct connection may be connected by a link, which may also be called an edge, or a segment. In an LCI grid representation, a first node and a second node are in direct connection if a person can walk from the first node location to the second node location (or vice versa) without visiting a third node. The process of transforming building map 100 to a map comprising a set of discrete nodes with connectivity information pertaining to the nodes may be seen as a form of map quantization.

In some embodiments, actual user trajectory plots, which may be obtained in variety of ways, including through the use one of more of the exemplary techniques described below, may be used to compute a cost associated with each combined map 500 obtained using the trajectory. Each combined map 500 may combine building map 100 and AP map 200 using a different relative orientation of the two maps. The LCI grid may be used in performing this cost analysis thereby determining an optimal relative orientation of the AP map with the building map.

In some embodiments, the estimation of relative AP locations may be accomplished using well-known techniques such as round-trip time (RTT) and/or received signal strength indication (RSSI) measurements and/or other well-known Self-Locating Access Point (SLAP) techniques. Assume there are a total of n access points. Each access point receives signals from the other access points and can compute a round-trip time (RTT) of the source access point with respect to a local frame of reference. A local frame of reference comprises a frame local to the AP network. The set of RTT measurements are collected and form data used to estimate the unknown AP locations. For example, one of the APs may be used as the origin of a local frame of reference and the positions of the other APs may be determined relative to the origin. Received signal strength indication (RSSI) measurements may also be used instead of, or in addition to, RTT measurements.

In some instances, heat maps or other RF maps may be generated using various models, for example, Line-of-Sight (LOS) distance related models using RSSI, and/or using RTT based techniques. For instance, the AP location information may be used to create the RSSI/RTT heat maps. In RSSI-based location techniques, the area served by the APs may be modeled, for example, as a two-dimensional raster array with uniform grid spacing, where a grid raster point may correspond to a location on heat map 300. Each raster point may be represented as a vector of RSSI values cross-referenced to APs using AP signatures. A predicted signal database may be created using complete raster array of RSSIs and the predicted signal database may be used by a Position Engine (PE) such as an RSSI-based PE to compare received signal strength measured by the AP to predicted signal database vectors, with the best match determining coordinates (x, y) of the most likely AP location. Partial RTT information may also be incorporated into the estimation procedure to improve the accuracy of the calibration.

If at least three access points are available, relative locations of all access points may be estimated. Thus, relative access point locations may be computed except for an unknown translation and rotation of the entire AP framework relative to building map 100. Additional absolute location information allows an estimation of this translation and rotation. With the additional absolute location information of one or two access points, absolute location and orientation estimates may be computed for all access points and this information may be used to generate combined map 500.

Assume we have a set of n access points in a plane, each with unknown location $\{x_i, y_i\}$ with $i=1, 2 \ldots n$. Each access point computes the RTT from the other access points. The measured RTT at access point i from access point j is denoted by $r_{ij}$.

A parameter vector may be defined as $$\alpha = \begin{bmatrix} (x_1, y_1) \\ \ldots \\ (x_n, y_n) \end{bmatrix} \quad (1)$$

Also, the RTT measurements are assumed to contain estimation errors. These measurements are collected in a vector X $$X = \mu(\alpha) + E \quad (2)$$

where $\mu(\alpha)$ is the noiseless measurement vector and E is a random vector with a known power distribution function (pdf). Given the measurements X, $\alpha$ can be estimated and the relative locations of the various APs may be obtained.

As explained above, α represents the relative access point positions of APs in a local coordinate frame of reference. Using AP locations, corresponding heat maps based on LCI characteristics may be generated. The heat maps may be based on information pertaining to connectivity of grid points in LCI grid, and/or the presence or absence of building features, such as hallways 130, walls 110, doors 120, exits 140 etc. In cases where LCI characteristics are unavailable, heatmaps 300 can be generated using very generic models, such as LOS distance related, in RSSI or in RTT.

Figure 7:
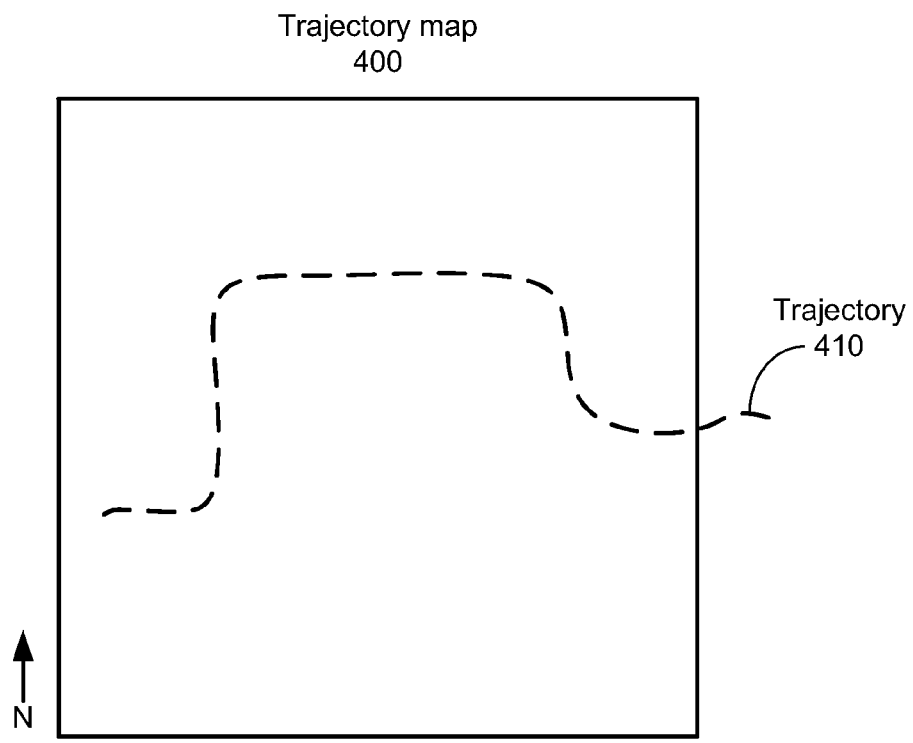
FIG. 7 shows an exemplary trajectory map showing a trajectory of a tracked mobile device through a building.

FIG. 7 shows an exemplary trajectory map 400 showing a trajectory 410 of a tracked mobile device through a building. In some embodiments, dynamic trajectory information related to trajectory 410 may be obtained by collecting mobile device location information in the actual physical building described by building map 100.

In some embodiments, APs such as AP0 210, AP1 220 . . . AP4 250, may collect information pertaining to the locations of users as they move through the building. For example, when a user walks through the building the user's phone/mobile device may access or attempt to access one or more of AP0 210, AP1 220 . . . AP4 250 at various times and points during the user's movement through the building. A unique ID may be created for each distinct cell phone or mobile device that interacts with the APs and the location of the mobile device through the building at various times may be tracked. For example, RSSI information may be used to determine the location of the mobile device relative to one or more APs.

In some embodiments, where the mobile devices may have access to location information such as GPS information, or information from inertial sensors that permit the mobile device to obtain a location estimate, the APs may request or the mobile devices may send, or be instructed to send, location information to the APs. For example, in a workplace environment, an application may be installed in a user's mobile device that reports location to the APs. In some embodiments, the location information reported to the APs may also include a field identifying the source of the location information such as whether the information was obtained using GPS, inertial sensors, etc.

Mobile device locations determined and/or reported above may be used to compute the trajectories of people moving within the building. For example, a set of locations associated with a mobile device within some defined temporal window may be considered as a trajectory. In some embodiments, multiple trajectories may be collected tracking several mobile devices to improve the performance. The multiple trajectories may be from the same mobile device over time or from multiple mobile devices simultaneously or over time. In some embodiments, a statistically significant number of trajectories may be estimated and one or more of these trajectories may include varied trajectories that cover a greater distance and/or include a number of turns within the building.

In some embodiments, the trajectories may be computed by one or more computing devices coupled to exemplary AP0 210, AP1 220 ... AP4 250. In some embodiments, AP0 210, AP1 220 ... AP4 250 may send time-stamped location information associated with one or more mobile devices to one or more coupled computing devices, which may store the location related information data in a database and compute a trajectory information from the location information. Statistical techniques may be used to correlate similar trajectories that vary minimally and techniques such as least squares estimation may be used to determine a set of non-overlapping or distinct trajectories. In some embodiments, each distinct identified trajectory may be associated with a unique trajectory identifier.

Figure 8:
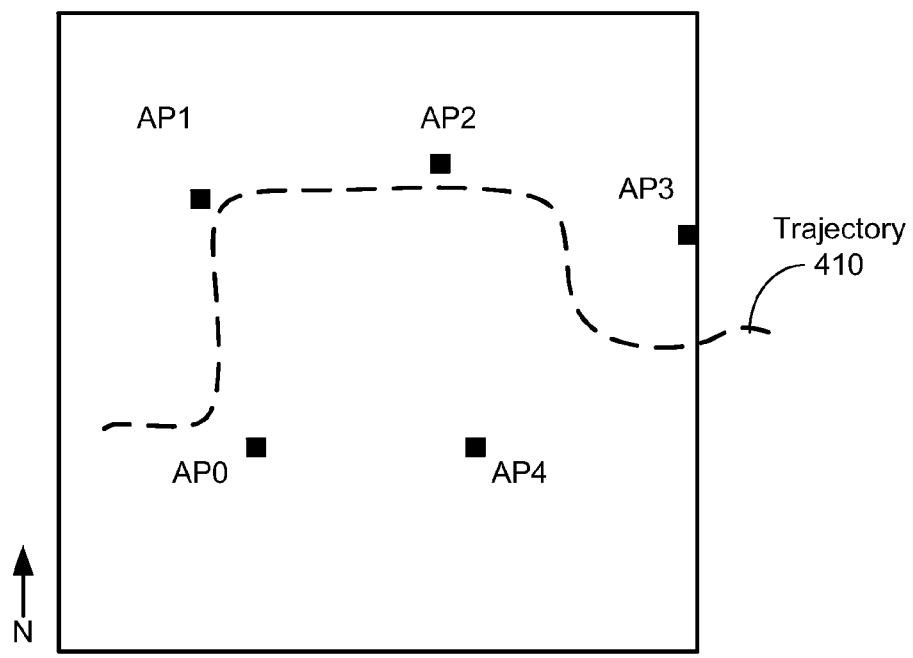
FIG. 8 shows a trajectory overlaid on an AP map.

FIG. 8 shows trajectory 410 overlaid on AP map 200. Because trajectory 410 was determined by exemplary APs AP0 210, AP1 220 ... AP4 250, overlaying trajectory 410 on AP map 200 and/or heat map 300 can be accomplished. For example, the locations of a mobile device relative to the APs during some period may be plotted and/or overlaid on AP map 200 and/or heat map 300. As shown in FIG. 8, trajectory 410 and AP map 200 and/or heat map 300 are merged to obtain merged map 420, which shows both AP locations and trajectory 410. In some embodiments, a particle filter or any other positioning engine may be used to obtain user trajectory 410 and overlay the trajectory on AP map 200 and/or heat map 300.

Figure 9:
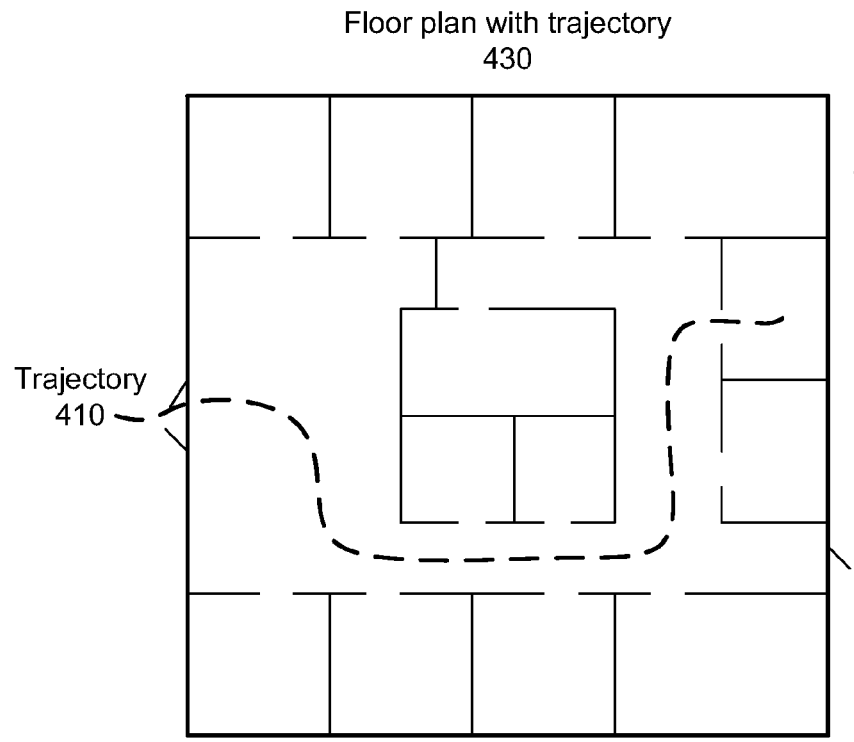
FIG. 9 shows an exemplary trajectory superimposed on a building map.

FIG. 9 shows exemplary trajectory 410 superimposed on building map 100. In some embodiments, after the computation of one or more trajectories 410, one of the trajectories 410 may be selected and used to determine how AP map 200 and/or heat map 300 can be merged with building map 100. For example, one or more trajectories 410 may be superimposed on building map 100 by using building map information to correlate paths in building map 100 with trajectory 410.

In one embodiment, building map 100, which may include a floor plan, may take the form of LCI grid comprised of equally spaced grid points with connectivity information between pairs of neighboring grid points. Nodes of open neighbors are connected whereas nodes that are physically separated are not connected. In an LCI grid representation, a node may mark a point on building map 100 and neighboring nodes that are in direct connection may be connected by link or edge. In an LCI grid representation, a first node and a second node are in direct connection if a person can walk from the first node location to the second node location (or vice versa) without visiting a third node.

In some embodiments, one or more trajectories 410 may be selected and correlated with likely paths in building map 100 or LCI grid for building map 100. In some embodiments, the trajectory 410 selected for correlation with one or more paths in building map 100 may be a complex trajectory that may be long and/or include several turns. Selecting a complex trajectory may increase the confidence level in the results of likely paths obtained using correlation.

Figure 10:
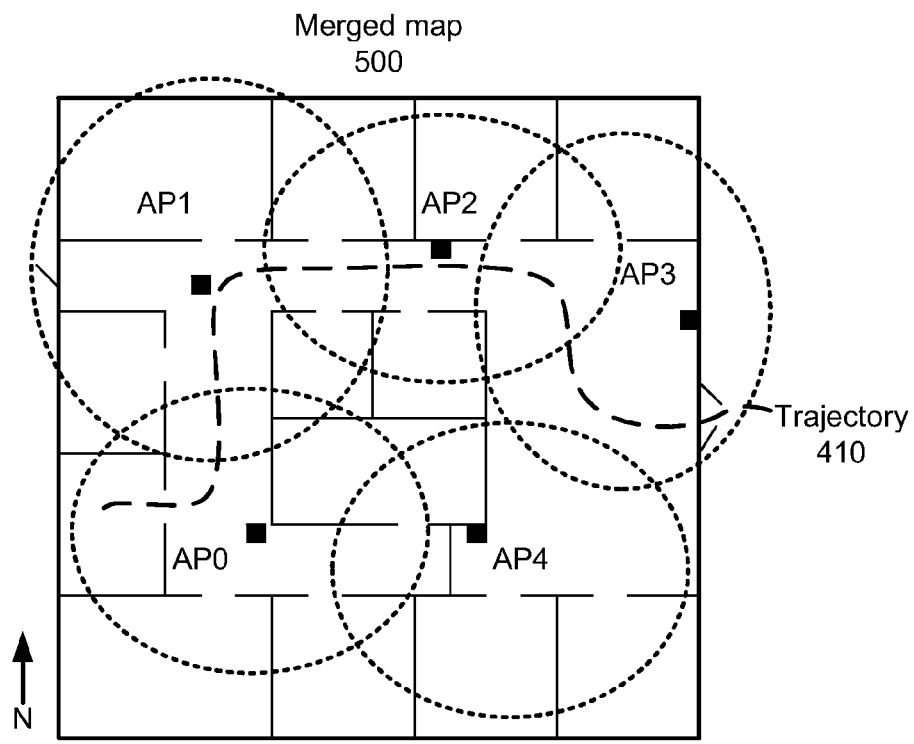
FIG. 10 shows a merged map showing AP locations, building information from a building map and trajectory.

FIG. 10 shows merged map 500 showing both AP locations, AP heat maps, building information from building map 100 and trajectory 410. In some embodiments, merged map 500 may be obtained using a series of correlations between likely paths on building map 100 and one or more trajectories 410.

In one embodiment, likely paths in building map 100 may be obtained by applying a likelihood heat map algorithm to the previously collected user/mobile device location data. The likelihood heat map algorithm identifies high probability travel areas in building map 100 based on previously collected user/mobile device location data. High probability travel areas may include heavily walked hallways and frequented open spaces. Typically, high probability travel areas are associated with a greater number of mobile device data points because the high probability travel areas may receive more traffic relative to areas of less traffic such as individual offices.

In some embodiments, a processor may correlate selected mobile device trajectory 410 with the set of high-probability possible paths and the high-probability path with the greatest correlation to the selected trajectory 410 may be selected as a match for trajectory 410.

In other embodiments, image matching or map matching algorithms may be used instead of a travel area heat map to correlate trajectory 410 with one or more paths in building map 100. For example, trajectory 410 may be superposed on a possible set of pathways and one of the pathways may be selected as corresponding to trajectory 410. A more non-uniform trajectory (i.e., many turns) may overlay on the building map with less uncertainty.

In some embodiments, a cost function associated may be associated with each mapping that maps trajectory 410 to one of a set of possible paths in building map 100 using LCI information. Each path in the set of possible paths in building map 100 that is being matched to trajectory 410 represents a hypothesis regarding relative orientation and scale between AP map 200 and/or heat map on one hand and building map 100 on the other. If a match is found, the merging of building map 100 and AP map 200 and/or heat map 300 may be accomplished by using the scale and orientation associated with the hypothesis.

In some embodiments, a high cost may be associated with a mapping when the trajectory 410 encounters wall 110 or another obstacle in building map 100. In some embodiments, costs may be associated with the length of the path, the number of turns a path takes etc. In some embodiments, the lowest cost mapping obtained using the cost function may be selected as the optimal mapping of trajectory 410 to a path in building map 100. Accordingly, a scale and relative orientation between building map 100 and AP map 200 and/or heat map may now be determined and the absolute locations of APs AP0 210, AP1 220 ... AP4 250 on building map 100 may also be determined.

In one embodiment, one of the APs may be placed on building map 100 based on the scale and relative orientation information associated with a selected hypothesis and the location of the other AP's may be computed because the relative locations of APs with respect to each other are known.

In some embodiments, the mapping function may commence by aligning the longest edge in a building path with the longest straight line edge in trajectory 410 and evaluate costs and hypotheses by adding segments to the longest edge in trajectory 410 corresponding segments to the path in building map 100 when determining if trajectory 410 matches a path on building map 100.

Figure 11:
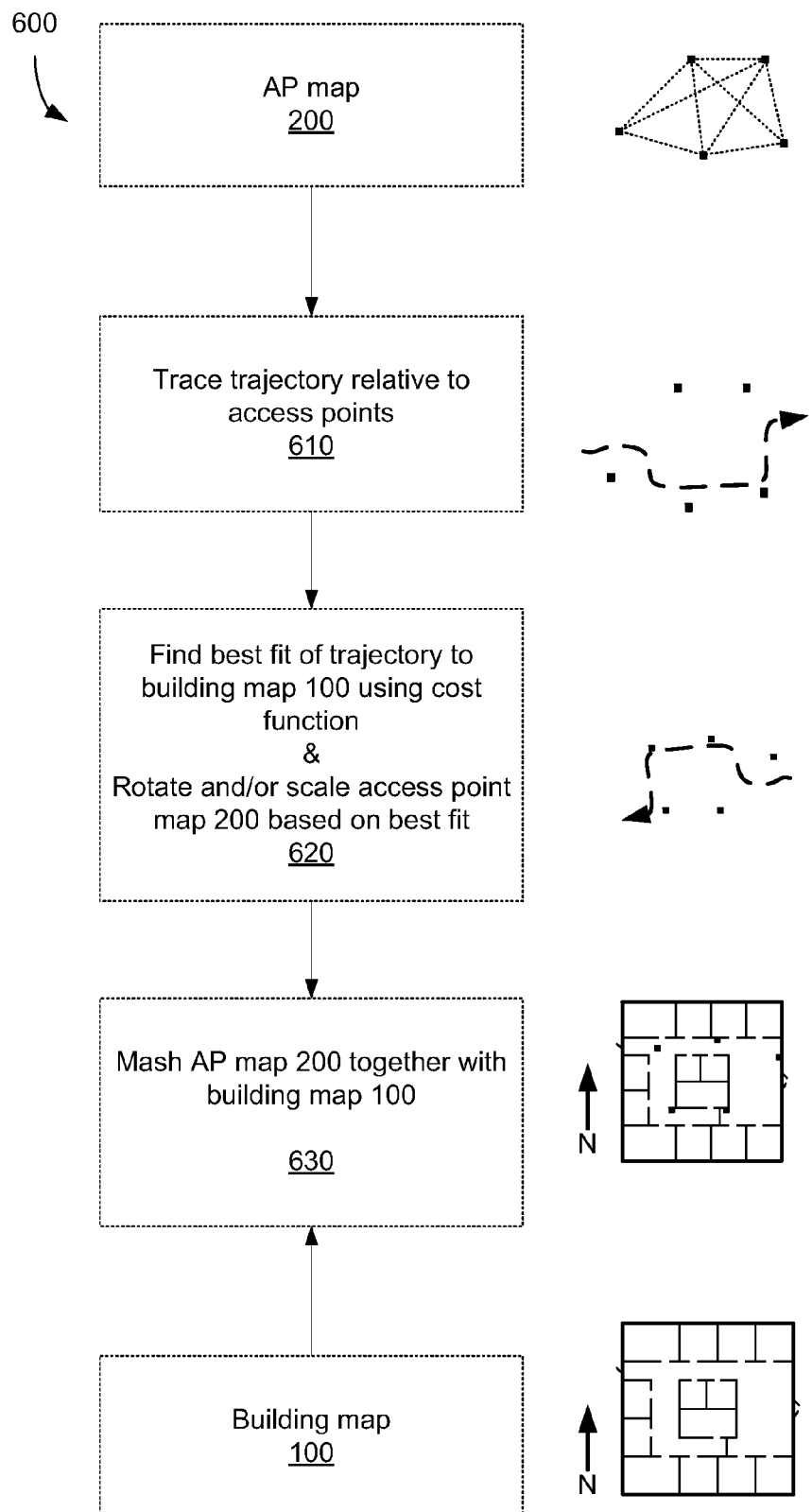
FIG. 11 provides a pictorial depiction 600 of an exemplary process to combine building map with AP map.

FIG. 11 provides a pictorial depiction 600 of an exemplary process to combine building map 100 with AP map 200. The icons to the right of the chart which are associated with the block to their immediate left, pictorially describe the process within the associated block.

As shown in FIG. 6, the process may start with two disjoint digital maps such as exemplary building map 100 and AP map 200 as inputs. Further, building map 100 may be converted to an LCI grid and/or location connectivity information may be obtained from building map 100 (not shown).

In some embodiments, the relative locations between the APs may be determined using various techniques described above, such as RTT.

In block 610, data relating to the locations of users/mobile devices may be collected and one or more trajectories may be determined relative to the locations of APs.

In block 620, a trajectory may be selected from among the trajectories determined in block 610 and a best fit of the trajectory to a path in building map 100 may be determined using a cost function. For example, the lowest cost mapping of the trajectory to a building path may be selected as the best fit. As used herein, the term "best fit" relates to the lowest cost trajectory. The lowest cost trajectory provides an optimal match to a building path.

Further, in block 620, the lowest cost trajectory is associated with a hypothesis that provides a relative orientation and a scale between building map 100 and AP map 200, which may be used to scale and rotate AP map 200.

In block 630, AP map 200 and building map 100 may be combined or mashed together using the scale and relative orientation information and the APs may be located on the combined map, which shows both building and AP location information.

Figure 12:
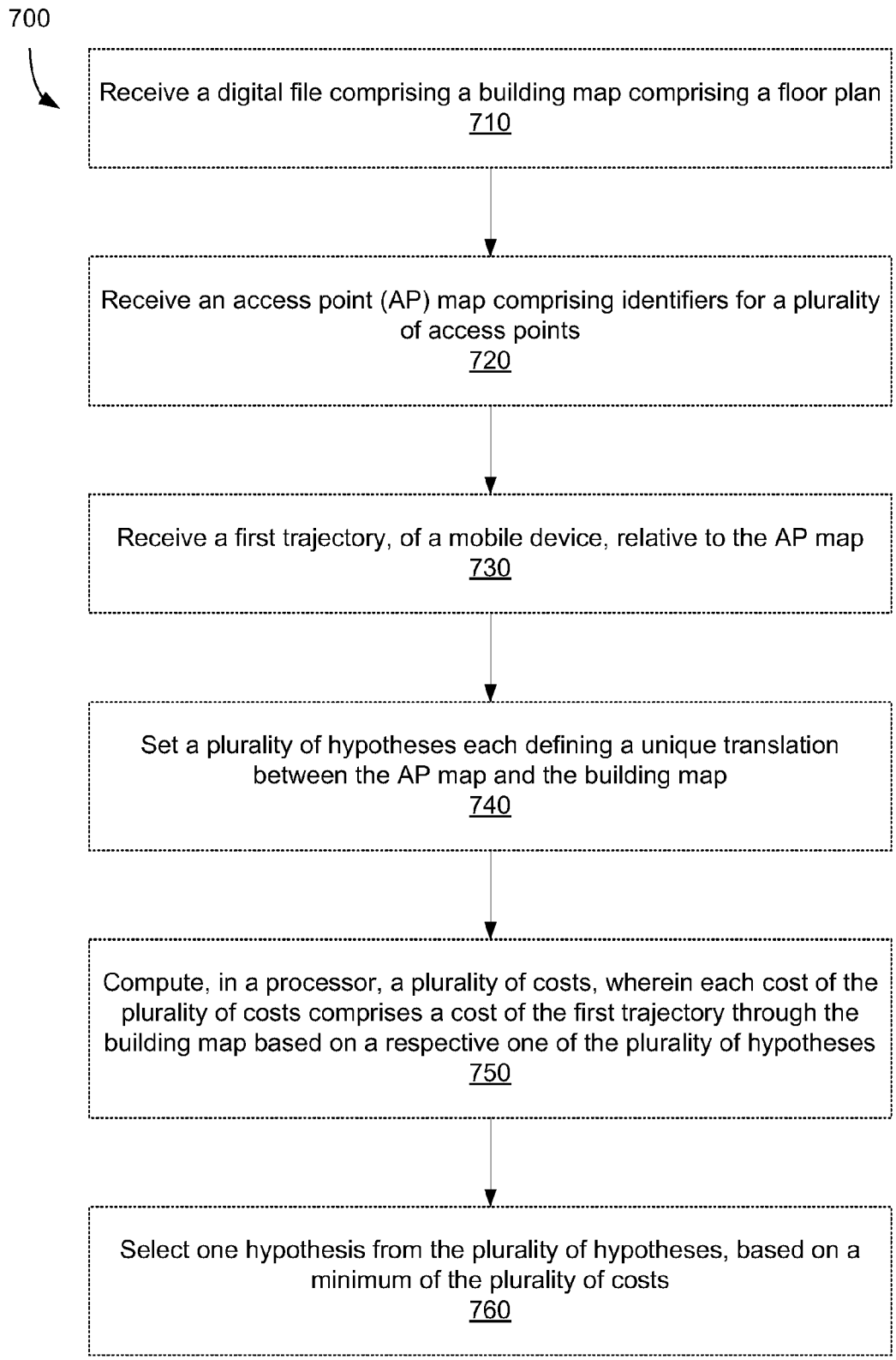
FIG. 12 shows a flowchart illustrating an exemplary method for combining a building map with an AP in a manner consistent with disclosed embodiments.

FIG. 12 shows a flowchart illustrating an exemplary method 700 for combining building map 100 with AP 200 in a manner consistent with disclosed embodiments. In some embodiments, method 700 may be performed by one or more computing devices, which may be coupled to an AP, or a set of networked APs including intelligent APs, and/or mobile devices. In some embodiments, method 700 may be performed by intelligent APs, which may be capable of performing various computations and/or executing other application program code. In general, method 700 may be performed by some combination of APs, intelligent APs, mobile devices and computing devices.

In step 710, a digital file comprising a building map, such as building map 100, which may include a floor plan, may be received or accessed.

Next, in step 720, a digital file comprising an AP map, such as AP map 200, may be received or accessed. AP map 200 may include identifiers for a plurality of APs.

In step 730, a first trajectory of a mobile device relative to the AP map may be received. In some embodiments, locations of mobile devices may be tracked and the information may be used to determine a first trajectory of a mobile device. In some embodiments, the first trajectory may be sent to or accessed, for example, by a computing device performing method 700.

Next, in step 740, a plurality of hypotheses may be set, where each hypothesis defines a unique translation between the AP map and the building map. For example, in one embodiment, a hypothesis may directly specify a scale and relative orientations between exemplary building map 100 and AP map 200. In another embodiment, a hypothesis may implicitly specify the scale and relative orientation, for example, by associating a trajectory (or a set of points) on exemplary AP map 200 with a path or (a set of points) on exemplary building map 100.

In some embodiments, in step 750, a plurality of costs may be computed for the first trajectory, where each cost of the first trajectory corresponds to a distinct hypothesis in the plurality of hypotheses. For example, a processor may compute a plurality of costs, wherein each cost of the plurality of costs comprises a cost of the first trajectory through the building map based on a corresponding hypothesis, which one of the plurality of hypotheses.

In step 760, the hypothesis where the first trajectory has the lowest cost relative to the other hypotheses may be selected. In some embodiments, where several hypotheses have the same cost, any one of the hypotheses may be selected. Because each hypothesis implicitly specifies a scale and relative orientation of exemplary building map 100 and AP map 200, the scale and relative orientation associated with the selected hypothesis may be used to rotate and scale AP map 200.and to place APs in AP map 200 on building map 100, thereby yielding a combined map showing both the floor plan and AP locations on the floor plan.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit.

Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A processor implemented method for merging disjoint maps, the method comprising:
   receiving a digital file comprising a pathway map;
   receiving a transmitter map comprising identifiers for a plurality of transmitters;
   receiving a first trajectory plot, of a mobile device, relative to the transmitter map;
   setting a plurality of hypotheses each defining a unique translation between the transmitter map and the pathway map;
   computing, in the processor, a plurality of costs, wherein each cost of the plurality of costs comprises a cost of the first trajectory plot through the pathway map based on a respective one of the plurality of hypotheses; and
   selecting one hypothesis from the plurality of hypotheses, based on a minimum of the plurality of costs.

2. The processor implemented method of claim 1, wherein the pathway map comprises a building map comprising a floor plan.

3. The processor implemented method of claim 1, wherein the transmitter map comprises an access point (AP) map, and wherein the plurality of transmitters comprises identifiers for a plurality of access points.

4. The processor implemented method of claim 1, wherein a source of the transmitter map is independent from a source of the pathway map.

5. The processor implemented method of claim 1, wherein a source of the pathway map comprises a source related to a venue operator.

6. The processor implemented method of claim 1, wherein a source of the pathway map comprises a source without knowledge of locations of the plurality of transmitters.

7. The processor implemented method of claim 1, wherein the pathway map further comprises a geo-location anchoring at least one point of the pathway map to the geo-location.

8. The processor implemented method of claim 1, further comprising quantizing the pathway map to a set of discrete nodes.

9. The processor implemented method of claim 1, wherein the transmitter map comprises an RSSI (received signal strength indication) map.

10. The processor implemented method of claim 1, wherein the transmitter map comprises an RTT (round-trip time) map.

11. The processor implemented method of claim 1, wherein the transmitter map further comprises a geo-location anchoring at least one of the plurality of transmitters to the geo-location.

12. The processor implemented method of claim 1, wherein the transmitter map comprises a SLAP (self-locating access points) set of devices.

13. The processor implemented method of claim 1, wherein the plurality of transmitters comprises at least part of a managed network.

14. The processor implemented method of claim 1, wherein the unique translation between the transmitter map and the pathway map comprises a relative rotation between the transmitter map and the pathway map.

15. The processor implemented method of claim 1, wherein the unique translation between the transmitter map and the pathway map comprises a relative scaling between the transmitter map and the pathway map.

16. The processor implemented method of claim 1, further comprising receiving a plurality of trajectory plots relative to the transmitter map.

17. The processor implemented method of claim 11, wherein the cost of the first trajectory plot through the pathway map based on the respective one of the plurality of hypotheses comprises a cost of the first of trajectory plots through a set of discrete nodes based on the respective one of the plurality of hypotheses.

18. The processor implemented method of claim 1, further comprising applying the one hypothesis selected as a best fit of the first trajectory plot and the pathway map to form a merged map.

19. The processor implemented method of claim 1, further comprising producing a merged map based on the one hypothesis selected, the transmitter map and the pathway map.

20. The processor implemented method of claim 19, wherein
   the pathway map further comprises a first geo-location anchoring at least one point of the pathway map to the first geo-location, wherein the first geo-location has a first uncertainty;
   the transmitter map further comprises a second geo-location anchoring at least one of a plurality of access points to the second geo-location, wherein the second geo-location has a second uncertainty; and
   the merged map comprises a third uncertainty less than the first uncertainty plus the second uncertainty.

21. The processor implemented method of claim 1, wherein the method is implemented on at least one of:
   a computing device; or
   a mobile device; or
   an access point; or
   an intelligent access point.

22. A mobile device for merging disjointed maps, the mobile device comprising:
   means for receiving a digital file comprising a route map;
   means for receiving a transmitter map comprising identifiers for a plurality of transmitters;
   means for receiving a first trajectory plot, of the mobile device, relative to the transmitter map;
   means for setting a plurality of hypotheses each defining a unique translation between the transmitter map and the route map;
   means for computing a plurality of costs, wherein each cost of the plurality of costs comprises a cost of the first trajectory plot through the route map based on a respective one of the plurality of hypotheses; and
   means for selecting one hypothesis from the plurality of hypotheses, based on a minimum of the plurality of costs.

23. The mobile device of claim 22, wherein a source of the transmitter map is independent from a source of the route map.

24. The mobile device of claim 22, further comprising quantizing the route map to a set of discrete nodes.

25. The mobile device of claim 22, wherein the transmitter map comprises an RSSI (received signal strength indication) map.

26. The mobile device of claim 22, wherein the transmitter map comprises an RTT (round-trip time) map.

27. The mobile device of claim 22, wherein the unique translation between the transmitter map and the route map comprises a relative rotation between the transmitter map and the route map.

28. The mobile device of claim 22, wherein the unique translation between the transmitter map and the route map comprises a relative scaling between the transmitter map and the route map.

29. The mobile device of claim 22, further comprising means for receiving a plurality of trajectory plots relative to the transmitter map.

30. The mobile device of claim 22, further comprising means for applying the one hypothesis selected as a best fit of the first trajectory plot and the route map to form a merged map.

31. The mobile device of claim 22, further comprising means for producing a merged map based on the one hypothesis selected, the transmitter map and the route map.

32. A mobile device comprising a processor and a memory for merging disjointed maps, wherein the memory includes software instructions for:
receiving a digital file comprising a route map;
receiving transmitter map comprising identifiers for a plurality of transmitters;
receiving a first trajectory plot, of a mobile device, relative to the transmitter map;
setting a plurality of hypotheses each defining a unique translation between the transmitter map and the route map;
computing a plurality of costs, wherein each cost of the plurality of costs comprises a cost of the first trajectory plot through the route map based on a respective one of the plurality of hypotheses; and
selecting one hypothesis from the plurality of hypotheses, based on a minimum of the plurality of costs.

33. The device of claim 32, further comprising applying the one hypothesis selected as a best fit of the first trajectory plot and the route map to form a merged map.

34. The device of claim 32, further comprising producing a merged map based on the one hypothesis selected, the transmitter map and the route map.

35. The device of claim 32, wherein the device is at least one of:
a computing device; or
a mobile device; or
an access point; or
an intelligent access point.

36. A non-transitory computer-readable storage medium including program code stored thereon, comprising program code for:
receiving a digital file comprising a route map;
receiving a transmitter map comprising identifiers for a plurality of transmitters;
receiving a first trajectory plot, of a mobile device, relative to the transmitter map;
setting a plurality of hypotheses each defining a unique translation between the transmitter map and the route map;
computing, in a processor, a plurality of costs, wherein each cost of the plurality of costs comprises a cost of the first trajectory plot through the route map based on a respective one of the plurality of hypotheses; and
selecting one hypothesis from the plurality of hypotheses, based on a minimum of the plurality of costs.

\* \* \* \* \*